Patented June 23, 1942

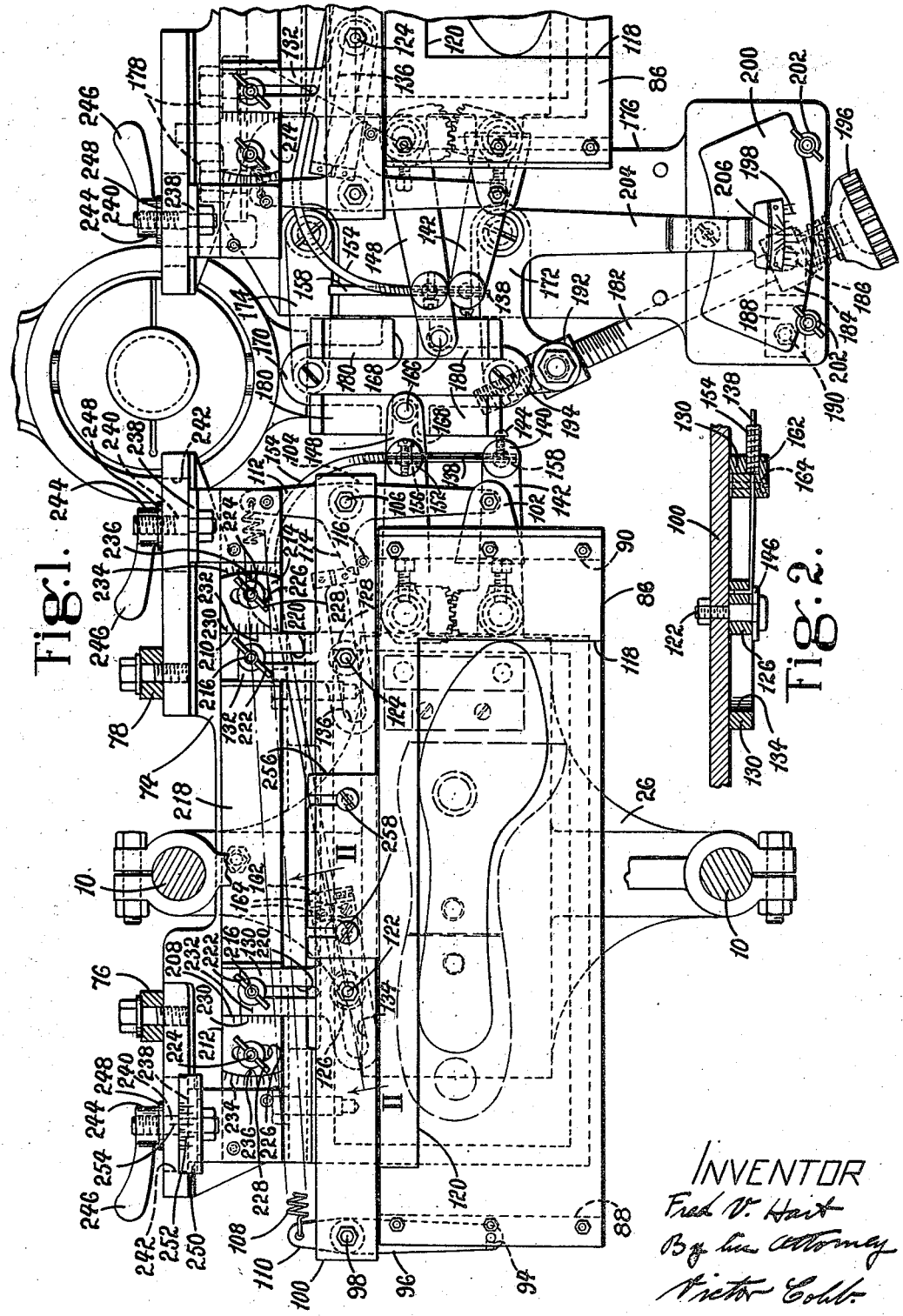

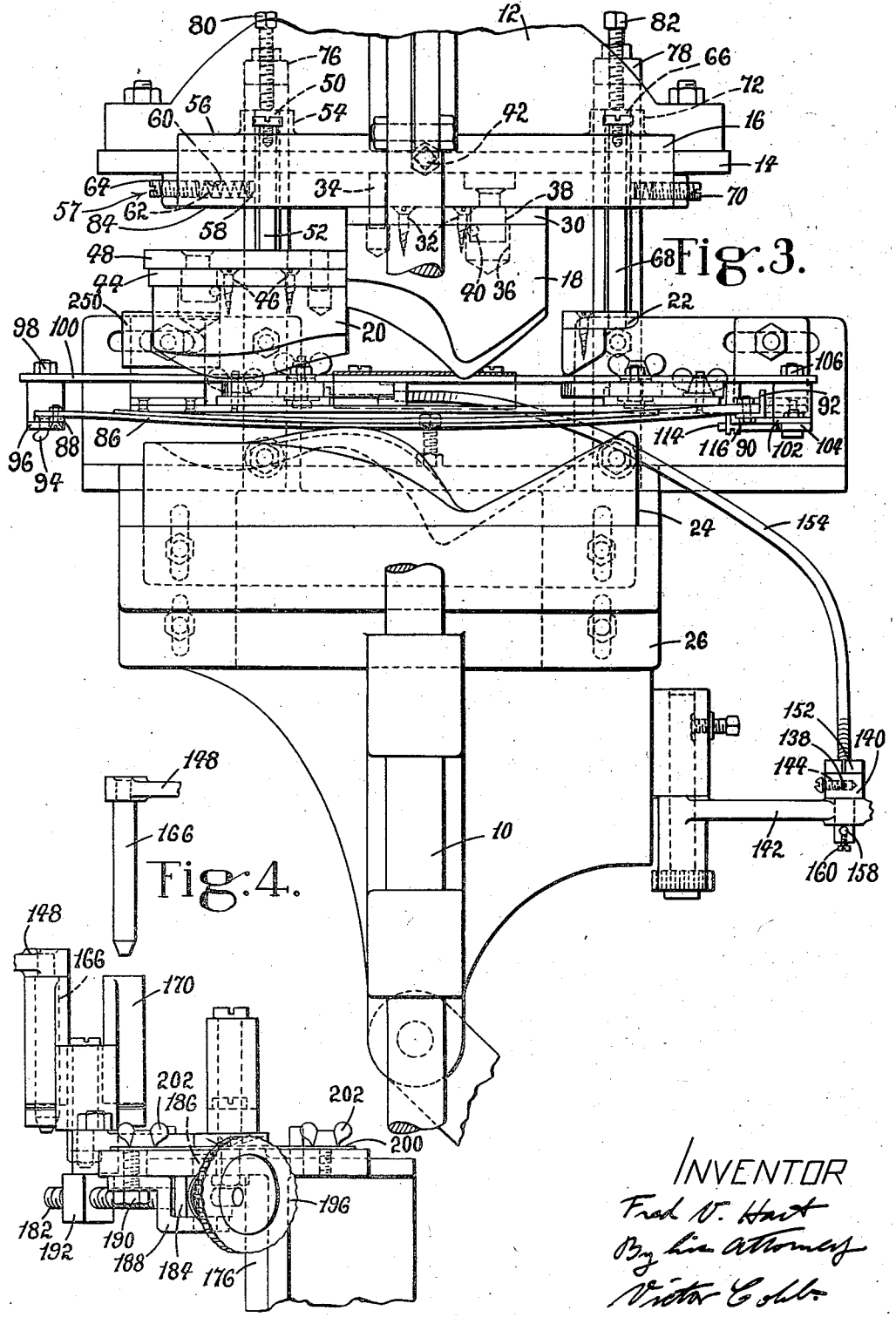

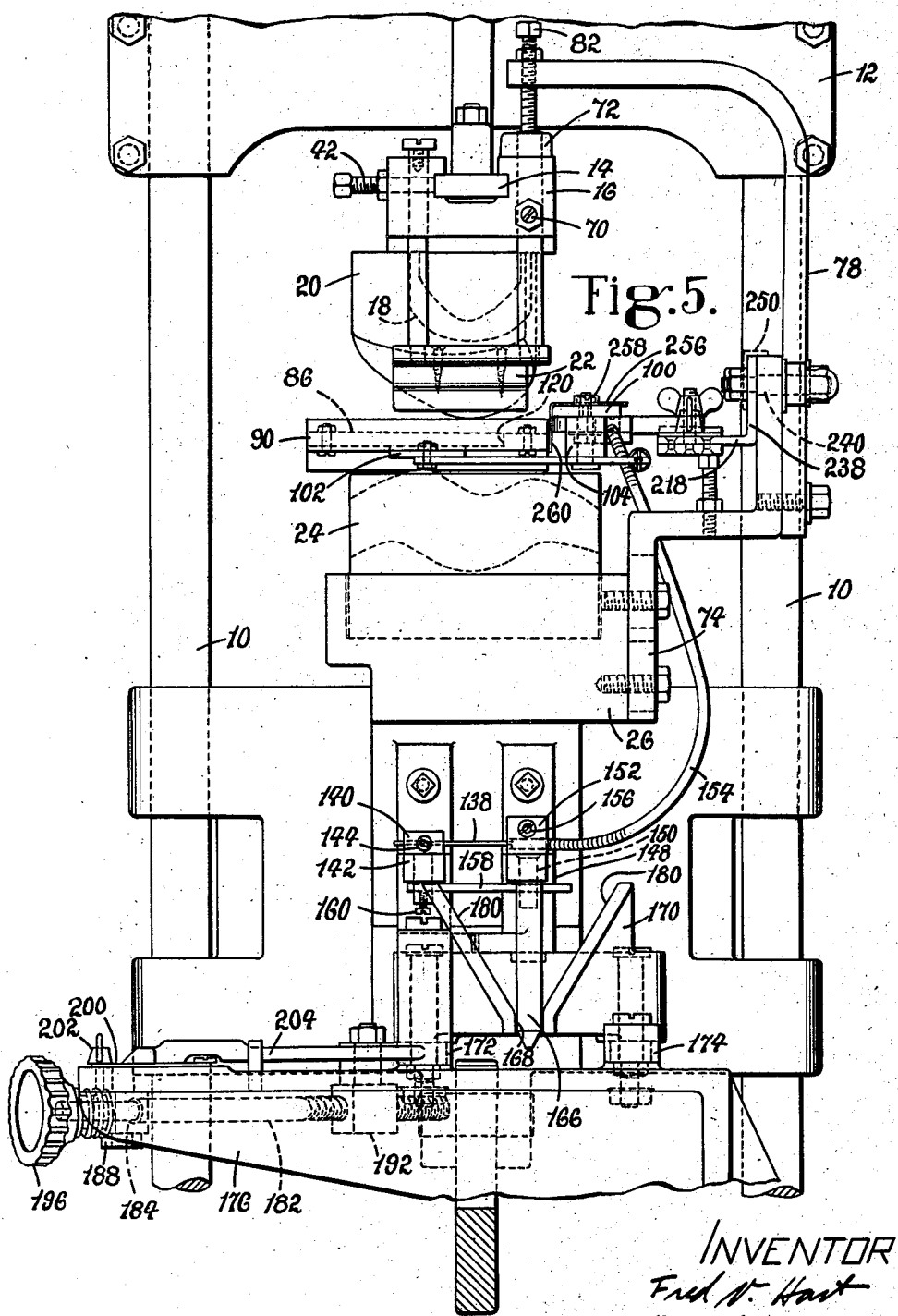

2,287,242

UNITED STATES PATENT OFFICE 2,287,242

MACHINE FOR SHAPING SOLES

Fred V. Hart, Lynn, Mass., assignor to United Shoe Machinery Corporation, Flemington, N. J., a corporation of New Jersey Application July 29, 1940, Serial No. 348,079

21 Claims. (Cl. 12—21)

This invention relates to machines for operating upon soles before they are incorporated in boots and shoes, and more particularly to machines for shaping or molding soles. The invention is herein illustrated by reference to a machine of the same general type as disclosed in Letters Patent of the United States No. 2,065,465, granted December 22, 1936, upon an application of John M. Whelton, provided with shaping or molding devices relatively movable to apply shaping pressure to a sole. It will be understood, however, that the invention in its more general aspects, is not limited to use in machines of the particular type illustrated.

Various novel features of the invention are to be recognized in the combination with shaping devices relatively movable to apply shaping pressure to a sole, of means for supporting a sole in position to be acted upon by said devices and in predetermined lengthwise and widthwise relation thereto but initially out of contact therewith. As illustrated, this means comprises a resilient rubber sheet or blanket arranged to extend between the shaping devices in position to receive and support a sole for the action of the shaping devices thereon, the blanket having gaging surfaces for engaging the edge face of the sole at an end and at one side respectively to locate the sole lengthwise and laterally of the shaping devices. As herein shown, means is provided comprising a pair of arms tending at all times to hold the blanket in a straightened condition for the ready reception and removal of soles but yieldable to permit the blanket to be conformed to the contours of the sole-pressing faces of the shaping devices in the shaping operation.

Preferably, and in accordance with further features of the invention, the resilient blanket is mounted for independent bodily adjustment in directions both lengthwise and widthwise of the shaping devices to position soles of different styles in proper lengthwise and widthwise relation to the shaping devices, and for movement in a direction at an adjustably variable angle relatively to the longitudinal axis of the shaping devices to position different sizes of soles of the same style in substantially the same lengthwise and widthwise relation to the shaping devices. Thus the position of one or both of the gaging surfaces of the resilient blanket may be varied relatively to the shaping devices as may be necessary to position a sole of the style to be operated upon in proper lengthwise and widthwise relation to the devices, after which the blanket may be moved in one direction at such an angle relatively to the longitudinal axis of the shaping devices as to cause the positions of both the gaging surfaces to be adjusted simultaneously to compensate for the length and width extensions of different sizes of soles of that style. In the construction herein shown, the shaping devices comprise a fixed form, a pressing member arranged to cooperate with the form to shape or mold a sole, and a support for moving the pressing member from an inoperative position toward the form to apply the shaping pressure and then reversely to release the sole from pressure. Conveniently, the means for moving the resilient blanket relatively to the form and pressing member into different positions for soles of different sizes is carried by the above-mentioned support, and there is provided a device or controlling member adjustable by the operator and arranged to cooperate with the last-named means to set the blanket for the size of sole to be operated upon only when the pressing member is in its inoperative position. In machines which include in their organization two sets of shaping devices alternately operable to apply pressure to different soles in different locations in the machine, such as the machine herein shown, a single controlling member may advantageously be utilized, as illustrated, to set both blankets for the same size of sole. As herein shown, if one of the blankets is set for a different size of sole from that being operated upon in the other half of the machine, the other blanket will automatically be set for the different size of sole in response to the return movement of its associated pressing member to inoperative position.

In accordance with a further feature of the invention, means is provided which is arranged to cooperate with the movable shaping or pressing member to clamp the toe and heel end portions of the sole to prevent lengthwise and lateral displacement of the sole in the shaping operation. As shown, there is slidably mounted on the support for the form a pair of clamping members located initially closer to the movable pressing member than the form. These clamping members are arranged to cooperate with the movable pressing member to clamp the toe and heel end portions of a sole on the resilient blanket and then to move with the pressing member into operative relation to the form for the shaping operation. Preferably and as illustrated, one of these clamping members comprises a second form for shaping an end portion of the sole, the movement of the second form relatively to the first form being limited when the second form has been moved into such relation to the first form that its sole-engaging surface forms a continuation of the sole-engaging surface of the first form.

The above and other features of the invention, including various novel details of construction and combinations of parts, will now be more particularly described with reference to the accompanying drawings and pointed out in the claims.

In the drawings,

Fig. 1 is a plan view of sole supporting and positioning mechanism embodying features of the present invention;

Fig. 2 is a section on the line II—II of Fig. 1;

Fig. 3 is a view in front elevation of the sole-shaping devices of the machine, illustrating the relation of the shaping devices to the sole supporting and positioning means when the parts are in their initial inoperative positions;

Fig. 4 is an angular view in elevation of a portion of the structure shown in Fig. 1; and Fig. 5 is a view in left-hand side elevation of the parts shown in Fig. 3.

The invention is herein illustrated as applied to a machine organization of the same general type as disclosed in the above-mentioned Letters Patent No. 2,065,465, and, accordingly, only such parts of the machine as it is necessary particularly to refer to for an understanding of the invention are herein shown and will be described in detail.

A machine of the type illustrated is a twin machine comprising two sets of instrumentalities which are substantial duplicates of each other and are operated alternately to apply pressure to different soles, the arrangement being such that, as a sole is subjected to pressure by either set of instrumentalities, a sole previously operated upon by the other set is released from pressure. The present drawings are confined mainly to that set of instrumentalities at the left-hand side of the machine. Associated with each set of instrumentalities is a pair of vertical rods 10 which support adjustably near their upper ends (Fig. 3) a crosshead 12. Adjustable along a guideway 14 on the crosshead 12 is a bracket 16 which in the machine herein shown supports sole clamping and shaping or molding devices 18, 20, and 22, hereinafter more particularly referred to, against the upwardly directed pressure of a pressing member or pad 24 of yieldable material comprising, preferably, a block of rubber which is seated in a recess in a carrier or pad box 26 mounted for vertical sliding movement on the rods 10. The means for applying operative movement to the carrier 26 is not shown in detail but is fully illustrated and described in the above-mentioned Letters Patent. It will be understood that when the carrier 26 and the pad 24 are in their lowermost positions, a sole is placed between the pad 24 and the clamping and shaping devices 18, 20, and 22, and that in the operation of the machine the pad is moved upwardly to apply pressure to the sole, after which the machine comes to rest, and that in the next operation of the machine the sole is released by downward movement of the pad simultaneously with the application of pressure to a sole by the other twin mechanism.

In the illustrated construction, the device or form 18 is arranged to operate on the shank portion of the sole and on a portion only of the forepart, the devices 20 and 22 being located initially closer to the pressing pad 24 than the form 18 and being moved relatively to the form 18 in the upward movement of the pressing pad 24 while cooperating with the pad to apply clamping pressure to the heel and toe end portions of the sole prior to the action of the form 18 on the sole, and thus to prevent lengthwise and lateral displacement of the sole in the shaping or molding operation. The form 18 of rigid material, preferably wood, is secured to a metal plate 30 by screws 32. The plate 30 is provided with openings to receive pins 34 that extend downwardly from the bracket 16 and with an enlarged opening 36 into which extends a stud 38 carried by the bracket 16 and provided with a spring-pressed pawl 40 arranged to press against the side wall of the opening 36 to secure the form 18 detachably to the bracket 16. The upper or sole-pressing face of the pad 24 is curved lengthwise and laterally somewhat more sharply than the lengthwise and lateral curvatures of the bottom face of the last for the shoe in which the sole is to be incorporated in order that the sole will be overmolded and thus allow for such reaction of the sole as may occur when the molding or shaping pressure is released. The bottom or sole-engaging face of the form 18 is shaped complementally to the corresponding portion of the sole-pressing face of the pad 24, the form 18 being positioned in proper lengthwise relation to the pad by adjustment of the bracket 16 along the guideway 14 and held in adjusted position by a set screw 42. The device or form 20 is arranged to cooperate with the pressing pad 24 to shape or mold the heel end portion of the sole and, accordingly, its bottom or sole-engaging face is shaped complementally to the heel end portion of the sole-pressing face of the pad 24. In the illustrated machine the sets of pressing pads 24 and forms 18 and 20, suitable for right and left soles respectively, will preferably be used in the opposite halves of the machine. It is contemplated that each set comprising a pad 24 and forms 18 and 20 may be used in operating upon different sizes of soles, either insoles or outsoles, of the same style, although for different styles of soles pads and forms differently shaped will be substituted.

The form 20, preferably of wood, is secured to a plate 44 by screws 46, and the plate 44 is detachably secured to a second plate 48 by means substantially like that provided for detachably securing plate 30 to the bracket 16. Extending upwardly from the plate 48 is a pair of vertical rods 50, 52 fitted to slide in openings in the bracket 16. The rod 50 has threaded on its upper end a collar 54 which, by engagement with the upper face 56 of the bracket 16, limits and determines the lowermost position of the form 20. A friction device 57 comprising a brass plug 58 (Fig. 3) mounted in a recess 60 in the bracket 16 and held by a spring 62 in engagement with the rod 50 tends to hold the form 20 against movement relatively to the bracket 16 and the form 18, a set screw 64 being provided for varying the tension of the spring 62.

The toe end clamping device 22 is carried by two upwardly extending rods 66, 68 fitted to slide in openings in the bracket 16, a friction device 70 being provided similar to the friction device 57 provided for the form 20 for holding the device 22 against movement relatively to the bracket 16 and the form 18. At its upper end there is threaded on the rod 66 a collar 72 for engaging the upper face 56 of the bracket 16 to limit and determine the lowermost position of the device 22. Secured to a bracket 74 fast to the pad box 26 are upwardly and forwardly extending arms 76, 78 (Figs. 3 and 5) carrying adjustable screws 80, 82 arranged respectively to engage the upper end faces of the rods 50 and 66 when the collars 54 and 72 are in engagement with the upper face 56 of the bracket 16 and the pad box 26 and the pressing pad 24 are in their lowermost positions in the machine. It will be understood that as the pad box 26 and the pad 24 are moved upwardly in the pressure-applying operation, the arms 76 and 78 are also moved upwardly to carry the screws 80 and 82 out of engagement with the rods 50 and 66, thus releasing the form 20 and the device 22 for upward movement with the pressing pad 24 against the resistance of the friction devices 57, 70. The construction is such that as the pad box moves upwardly and before the final heavy shaping or molding pressure is applied to the sole, the plate 48 to which the form 20 is secured will engage the bottom face 84 of the bracket 16, thus limiting upward movement of the form 20 with its sole-engaging face forming a continuation of the sole-engaging face of the form 18. As the final heavy pressure is applied, a further upward movement may be imparted to the toe-clamping device 22 without, however, moving it upwardly far enough to engage the bracket 16, thus preventing any rigid clamping of the toe end portion of the sole.

In the illustrated machine, each sole to be operated upon is supported between the pad 24 and the devices 18, 20, and 22 by means which acts also to position the sole in predetermined widthwise and lengthwise relation to the pad and said devices for the shaping or molding operation. This means comprises, as herein shown, a sheet or blanket of rubber or other resilient material 86 to the opposite end portions of which are secured metal clamps 88, 90 (Fig. 1), the clamp 90 being provided with an upstanding lip 92 for engaging one end face of the blanket 86. The clamp 88 has formed thereon a downwardly extending, hook-shaped projection 94 (Fig. 3) which is arranged to extend through an opening in the forward end of an arm 96 pivotally connected at 98 to a supporting plate 100. Formed on the clamp 90 is a projection 102 by means of which the clamp 90 and the blanket 86 are pivotally connected to the forward end of one arm of a bell-crank lever 104 which is pivotally connected at 106 (Fig. 1) to the opposite end portion of the plate 100. A spring 108 connected at one end to a rearward projection 110 on the arm 96 and at the other end to a rearward projection 112 on the bell-crank lever 104 tends to swing the arm 96 and the bell-crank lever 104 in opposite directions to tension the blanket between them and to hold the blanket in predetermined lengthwise relation to its supporting plate 100, determined by engagement of a second arm 114 on the bell-crank lever 104 with a pin 116 projecting from the plate 100. The blanket 86 has formed thereon a shoulder 118 for engaging the edge face of the sole at the toe end, and a shoulder 120 for engaging the outer edge face of the sole at the forepart and the heel end.

Carried by the plate 100 are depending shouldered studs 122, 124 on which are mounted respectively blocks 126, 128 engaging guide members 130, 132 in slots 134, 136 formed respectively in the members 130, 132 which support the plate 100 and relatively to which the plate may be moved by means now to be described. Connected to the block 126 is a flexible rod 138 (Fig. 1) which is connected at its opposite end to a stud 140 which is mounted to turn in an arm 142. The rod 138 extends into an opening in the head of the stud 140 and is secured thereto by means of a set screw 144. As shown in Fig. 2, one end portion of the rod 138 is bent upwardly to extend into an opening in the block 126 in which it is held by a washer 146 under the head of the shouldered screw 122. The arm 142 is pivotally connected to the pad box support or carrier 26 and is geared to a second arm 148 also pivotally connected to the support 26 and having loosely mounted therein a stud 150 provided with a head 152 drilled to receive the end portion of a flexible cover or conduit 154 for the flexible rod 138. The head 152 of the stud 150 is formed in two halves connected together by means of a clamping screw 156 which may be tightened to draw the two halves of the head together to clamp conduit 154 to the stud 150. The studs 140 and 150 are located in their respective arms 142 and 148 equidistant from the pivotal connections of the arms to the support 26, and extending through an opening in the stud 140 below the arm 142 is a short rod 158 which is secured to the stud 140 by a set screw 160. The rod 158 extends rearwardly through an opening formed in the stud 150 below the arm 148 and thus acts to hold the studs 140 and 150 against rotation relatively to each other. At its opposite end the conduit 154 is clamped to the guide member 130 by means of a cap 162 and screws 164 (Figs. 1 and 2) so that by movement of the arms 142 and 148 toward or from each other the plate 100 and the blanket 86 may be moved either to the left or to the right relatively to the guide members 130, 132 (Fig. 1) to vary the position of the sole-locating shoulder 118 lengthwise of the pressing pad 24 and forms 18 and 20 for soles of different lengths. Carried by the arm 148 is a downwardly extending pin 166 which, when the parts are in the positions shown in Fig. 5, extends into a central recess or slot 168 formed in an adjustable member 170 which is carried by parallel arms 172, 174 of equal length pivotally connected to a bracket 176 secured by screws 178 to the frame of the machine (Fig. 1). By reference to Fig. 1, it will be seen that the member 170 is provided with a slot 168 to receive the pin 166 in each half of the machine, and extending upwardly from each slot 168 are inclined surfaces 180 (Fig. 5) for guiding each pin 166 into its slot 168 in the return movement of each pad box 26 to its initial or inoperative position. For adjusting the member 170, there is provided a rod 182 rotatably mounted in a block 184 on which is formed a trunnion 186 journaled in the bracket 176, a small plate 188 secured to the bottom face of the bracket by a screw 190 being provided for supporting the block 184. The rod 182 extends rearwardly through a threaded block 192 journaled in a lateral projection 194 on the arm 172, and pinned to the outer end of the rod 182 is a hand wheel 196 for turning it. It will be evident that the position of the member 170 will determine the lengthwise position of each blanket 86 and its sole-locating shoulder 118 relatively to its associated pad 24 and shaping devices 18 and 20 for the size of sole next to be operated upon, and that by rotation of the hand wheel 196 the adjusted position of the member 170 may be varied to vary the adjusted position of the blanket 86 for soles of different lengths. In order to assist the operator in adjusting the position of the member 170, there is provided a size scale 198 on a plate 200 clamped to the bracket 176 by screws 202, and carried by a forwardly extending arm 204 formed integral with the arm 172 is a width scale 206 arranged to cooperate with the size scale 198. Since soles of the same size but of different widths vary slightly in length, the width scale 206 is provided so that the operator may determine the correct adjusted position of the member 170 for soles of slightly different lengths because of their variation in width.

As previously pointed out, adjustment of the blanket 86 for soles of different lengths is effected through the flexible rod 138 and conduit 154 in response to the swinging of the arms 142 and 148 toward or from each other by adjustment of the control member 170. As the blanket is thus moved, it is guided by engagement of the blocks 126 and 128 carried by the plate 100 with the guide members 130 and 132 in the slots 134 and 136 formed in the guide members. The lengths and widths of various sizes of soles of the same style vary proportionately between different sizes, that is, the ratio of the width extension to the length extension between soles of different sizes is substantially constant. Accordingly, in order that the blanket 86 may be positioned in proper widthwise relation to the molding or shaping devices as it is adjusted lengthwise thereof to accommodate soles of different lengths, the guide members 130, 132 are so mounted that the slots 134 and 136 may be inclined at such an angle relatively to the longitudinal axis of the soles that when the blanket 86 is moved lengthwise to accommodate a change in length of soles, it will also be moved widthwise of the sole an amount equal to the corresponding change in width. As herein shown, the guide members 130 and 132 are fitted to slide in guideways 208, 210 formed respectively in tables 212, 214. Each table 212, 214 is rotatable about the axis of a vertical stud 216 that projects upwardly from a bracket 218 through an opening in the table and through an elongated slot 220 in its associated guide member 130, 132. Threaded on the upper end of each stud 216 is a wing nut 222 for holding each guide member 130, 132 against movement relatively to its associated table 212, 214. Projecting upwardly from the bracket 218 are studs 224 that extend through arcuate slots 226 in the tables 212, 214, and threaded on the upper ends of the studs 224 are wing nuts 228 for holding the tables against rotation about the axes of the studs 216. It will be understood that the guide members 130 and 132 may be adjusted independently of each other laterally of the shaping or molding devices to position a sole of any style in proper widthwise relation to said devices, and that they may be adjusted also independently of each other about the axes of the studs 216 to vary the angle or angles at which the slots 134 and 136 are inclined relatively to the longitudinal axis of the sole so that when the blanket 86 is moved longitudinally to accommodate a change in length of soles of the particular style being operated upon, it will also be moved widthwise of the sole an amount equal to the corresponding change in width. Marked on each table 212, 214 are graduations 230 and on each of the guide members 130, 132 an index 232, so that the adjusted position of each guide member laterally of the pad 24 may be recorded for the style of sole being operated upon. Also marked on the bracket 218 are graduations 234 and on each table 212, 214 an index 236, so that the adjusted position of each guide member about the axis of its associated stud 216 to vary the angle of its guiding slot 134, 136 may be recorded.

Since the foreparts of soles of the same size but of different styles sometimes vary considerably in length, it is desirable that the blanket 86 be so mounted that it may be adjusted lengthwise of the molding or shaping devices, without necessarily varying its adjusted position laterally of said devices. As above pointed out, the blanket 86 and the parts associated therewith for varying its widthwise position are supported by the bracket 218. Accordingly, in the illustrated construction, the bracket 218 is secured to the bracket 74 in such manner that it may be adjusted relatively to the bracket 74 to vary the lengthwise position of the blanket 86. As herein shown, each bracket 218 (Figs. 1 and 5) has a pair of vertical arms 238 carrying screws 240 that extend through elongated slots 242 in its associated bracket 74. Threaded on the rear ends of the screws 240 are nuts 244, each of which is provided with a handle 246 for turning it, a washer 248 being provided between each nut 244 and the bracket 74. It will be evident that by loosening the nuts 244, the bracket 218 and the parts supported thereon, including the plate 100 and the blanket 86 may be moved lengthwise of the pressing pad 24 and the forms 18 and 20 to position a sole having either a long or a short forepart, with the junction of its forepart and shank portion in alinement with the junction of the forepart and shank-pressing faces of the pad 24 and the form 18, after which the bracket 218 may be secured to the bracket 74 with the blanket in adjusted position by tightening the nuts 244. Secured to each bracket 218 by one of the screws 240 is an L-shaped piece 250, one of which is shown in Fig. 1 provided with a scale 252, and cooperating with each scale is an index 254 on each bracket 74 to enable the operator to adjust the brackets 218 to the same lengthwise position relatively to the pressing pads 24 and forms 18 and 20 in the opposite halves of the machine in operating upon right and left soles of the same style.

In the operation of the machine, the operator will place a sole, which may be either an insole or an outsole, on the blanket 86 in that half of the machine in which the pressing pad 24 is in its lowermost position, with the edge face of the sole at the toe end in engagement with the shoulder 118 on the blanket and the outer edge face of the sole in engagement with the shoulder 120 on the blanket. If the sole is of a different style from that previously operated upon, the operator after adjusting the controlling member 170 for the size of the sole will, if necessary, adjust the bracket 218 relatively to the bracket 74 to bring the ball line, i. e., the junction of the forepart and shank portions of the sole, into alinement with the ball line of the pad 24 and the form 18. He will also, if necessary, adjust the guiding members 130, 132 so that the longitudinal axis of the sole will be parallel to the longitudinal axis of the pad 24 and the forms 18 and 20, and the slots 134 and 136 will be inclined relatively to the longitudinal axis of the sole at an angle or angles, the tangent or tangents of which represents the ratio of the increase in width at the heel end and at the forepart to the increase in length between successive sizes of soles. For preventing accidental lateral displacement of the blanket 86 as the sole is positioned thereon by the operator against the shoulder 120, there is provided a supporting piece 256 (Figs. 1 and 5) secured to each plate 100 by screws 258 and having a downwardly extending portion 260 for engaging the rear edge face of the blanket. With the blanket 86 adjusted properly for the size and style of sole to be operated upon, the operator will start the power operation of the machine by movement of the two hand levers (not herein shown) with which machines of the illustrated type are provided to cause upward movement of the pad box 26. As the pad box 26 moves upwardly, it acts first through the blanket 86 to press the heel and toe end portions of the sole against the form 20 and the member 22, and with the heel and toe end portions of the sole thus clamped to prevent lengthwise and lateral displacement of the sole from adjusted position, the form 20 and the member 22 move upwardly with the pad 24 against the resistance of the frictional devices 57, 70 until the plate 48 engages the bottom face 84 of the bracket 16. It will be understood that by reason of the upward movement of the arms 76 and 78 with the pad box 26 the form 20 and the clamping member 22 are released for upward movement with the pad box and that with the plate 48 in engagement with the bottom face 84 of the bracket 16 the bottom or sole-engaging face of the form 20 forms a continuation of the sole-engaging face of the form 18. Thereafter heavy shaping or molding pressure is applied to the sole by further upward movement of the pad box 26, after which the machine comes to rest with the sole under pressure. It will also be understood that as the pad box 26 in one half of the machine moves upwardly to apply pressure to a sole, the pad box in the other half of the machine is lowered to release from pressure a sole previously operated upon. If the controlling member 170 has been adjusted for a size of sole different from that previously operated upon in the other half of the machine, the blanket 86 in that half of the machine will automatically be moved to the position determined by the controlling member 170 by engagement of the pin 166 with one or the other of the inclined surfaces 180 on the member 170 in the return of its associated pad box 26 to its lowermost position in the machine. It will be evident that in the shaping or molding operation the rubber blanket will stretch and be conformed to the contour of the sole-engaging faces of the forms 18 and 20 and that as the parts are returned to their initial starting positions the spring 108 will act through the arms 96 and 104 to return the blanket to its initial straightened condition above the pad 24 with the molded sole resting thereon out of contact with the forms 18 and 20 and the member 22, ready to be removed by the operator.

Having described the invention, what I claim as new and desire to secure by Letters Patent of the United States is:

1. In a machine for shaping soles, the combination with devices relatively movable to apply shaping pressure to a sole, of means for supporting a sole in position to be acted upon by said devices but initially out of contact therewith, said means comprising a member of greater area than the sole and located between said devices in position to receive a sole and having formed thereon gaging surfaces arranged respectively to engage the edge face of the sole at an end and at one side to locate the sole lengthwise and laterally of said shaping devices, and means for adjusting said sole supporting means to vary the location of the gaging surfaces thereon relatively to the shaping devices to accommodate soles of different styles and sizes.

2. In a machine for shaping soles, the combination with devices relatively movable to apply shaping pressure to a sole, of resilient means for supporting a sole independently of said devices in position to be acted upon thereby, said resilient means comprising a rubber blanket arranged to extend between said devices and having formed thereon gaging surfaces for locating the sole in predetermined lengthwise and widthwise relation to the shaping devices, and means for adjusting said sole supporting means to vary the location of the gaging surfaces thereon relatively to the shaping devices to accommodate soles of different styles and sizes.

3. In a machine for shaping soles, the combination with devices relatively movable to apply shaping pressure to a sole before it is assembled with other shoe materials on a last, of a resilient member arranged to extend between said devices in position to receive and support a sole for the shaping operation, said member being initially out of contact with said devices but being conformable to the contours of the sole-shaping faces of said devices in the shaping operation, and yieldable means tending to hold said resilient member in a substantially straightened condition for the reception and removal of soles.

4. In a machine for shaping soles, the combination with devices relatively movable to apply shaping pressure to a sole, of a resilient rubber blanket for supporting a sole in position to be operated upon by said devices, and a pair of arms tending normally to hold said blanket in a tensioned condition for the removal and reception of soles but yieldable to permit the blanket to be conformed to the contours of the sole-pressing faces of said devices in the shaping operation.

5. In a machine for shaping soles, the combination with devices relatively movable to apply shaping pressure to a sole, of a resilient blanket arranged to extend between said devices in position to receive and support a sole for the shaping operation, a member for supporting said blanket, a pair of arms pivotally connected to said member and to the opposite ends of said blanket, a spring tending to swing said arms in opposite directions to tension the blanket between them, and a stop carried by said member for limiting the swinging movement of one of said arms to determine the lengthwise position of the blanket relatively to said member.

6. In a machine for shaping soles, the combination with devices relatively movable to apply shaping pressure to a sole, of means for engaging one face of a sole substantially throughout the length and width of the sole to support it in position to be acted upon by said devices but initially out of contact therewith, said means being constructed to locate the sole lengthwise and laterally of the shaping devices by engagement with the edge face of the sole at an end and at one side and being also adjustable relatively to the shaping devices to accommodate soles of different sizes and styles.

7. In a machine for shaping soles, the combination with devices relatively movable to apply shaping pressure to a sole, of sole-supporting means comprising a member arranged to extend between said devices in position to receive and support a sole for the action of said devices thereon, said member having gaging surfaces thereon arranged respectively to engage the edge face of the sole at an end and at one side to locate the sole lengthwise and laterally of the shaping devices, and said member being mounted to slide in a direction oblique relatively to the longitudinal axis of the shaping devices to locate different sizes of soles in proper lengthwise and widthwise relation to said devices.

8. In a machine for shaping soles, the combination with devices relatively movable to apply shaping pressure to a sole, of a resilient member arranged to extend between said devices in position to receive and support a sole for the action of said devices thereon, said member having abutments arranged respectively to engage the edge face of the sole at an end and at one side to position the sole lengthwise and laterally of said devices, said resilient member being mounted independently of said shaping devices for movement in a direction inclined relatively to the longitudinal axis of the shaping devices to position soles of different sizes in substantially the same lengthwise and widthwise relation to said shaping devices.

9. In a machine for shaping soles, the combination with devices relatively movable to apply shaping pressure to a sole, of a resilient member arranged to extend between said devices in position to receive and support a sole for the action of said devices thereon, said member having abutments adapted respectively to engage the edge face of the sole at an end and at one side to position the sole lengthwise and laterally of said shaping devices, and supporting means for said resilient member comprising a plate and guiding members on which said plate is slidably mounted, said guiding members being angularly adjustable relatively to said shaping devices to cause the resilient member by movement in one direction simultaneously to position soles of different sizes both lengthwise and widthwise of said shaping devices.

10. In a machine for shaping soles, the combination with devices for applying shaping pressure to different sizes of soles of the same style, said devices being mounted for relative movement to apply shaping pressure to each sole, of a resilient member for supporting each sole in position to be acted upon by said devices and for determining the position of the sole relatively to said devices by engagement with its edge face at an end and at one side of the sole, said resilient member being independently adjustable bodily in directions both lengthwise and widthwise of said devices to position a sole of the style to be operated upon in proper lengthwise and widthwise relation to said shaping devices and being also mounted for movement in a direction inclined with respect to the longitudinal axis of the sole to position different sizes of soles of the same style in substantially the same lengthwise and widthwise relation to the shaping devices.

11. In a machine for shaping soles of different sizes and styles, the combination with devices relatively movable to apply shaping pressure to each sole, of a resilient member for supporting each sole in position to be acted upon by said devices and for determining the position of each sole relatively to said devices by engagement with its edge face at one end and at a side of the sole, said resilient member being independently adjustable bodily in directions both lengthwise and widthwise of said devices to position soles of different styles in proper lengthwise and widthwise relation to the shaping devices, and said resilient member being also mounted for movement in a direction at an adjustably variable angle with respect to the longitudinal axis of the shaping devices to position soles of different sizes and styles in substantially the same lengthwise and widthwise relation to said shaping devices.

12. In a machine for shaping soles, the combination with devices relatively movable to apply shaping pressure to a sole, of a member arranged to extend between said devices in position to receive and support a sole for the action of said devices thereon, said member being located at all times between said devices and being provided with gaging surfaces arranged respectively to engage the edge face of the sole at an end and at spaced points at one side to locate the sole lengthwise and laterally of the shaping devices, and means for supporting said member for rectilinear adjustment to vary the positions of all of said gaging surfaces simultaneously to compensate for the length and width extensions of soles of different sizes whereby each sole may be positioned in substantially the same lengthwise and widthwise relation to said shaping devices.

13. In a machine for shaping soles, the combination with devices relatively movable to apply shaping pressure to a sole, of a member arranged to extend between said devices in position to receive and support a sole for the action of said devices thereon, said member being of greater area than the sole and being provided with gaging surfaces arranged respectively to engage the edge face of the sole at an end and at selected points at one side to locate the sole lengthwise and laterally of the shaping devices, said member being adjustable lengthwise of said shaping devices to accommodate soles of different sizes and means for varying the position of said member laterally of the shaping devices in response to its lengthwise adjustment to position different sizes of soles in substantially the same widthwise relation to said shaping devices.

14. In a machine for shaping soles, the combination with devices relatively movable to apply shaping pressure to a sole, of a member arranged to extend between said devices in position to receive and support a sole for the action of said devices thereon, said member being provided with gaging surfaces arranged respectively to engage the edge face of the sole at an end and at one side to locate the sole lengthwise and laterally of the shaping devices, said member being adjustable to vary the position of one or both said gaging surfaces to accommodate soles of different styles and being also adjustable to vary the positions of both said gaging surfaces simultaneously to compensate for the length and width extensions of soles of different sizes.

15. In a machine for shaping soles, the combination with a form, a pressing pad, and a support for moving said pad from an inoperative position toward said form to apply shaping pressure to a sole and then reversely to release the sole from pressure, of a resilient blanket extending between the form and said pad for supporting a sole for the pressing operation, said blanket having shoulders thereon for engaging the edge face of the sole at the toe end and at one side respectively to locate the sole lengthwise and laterally of the form and pad, said blanket being mounted for movement into different adjusted positions to locate soles of different sizes in substantially the same lengthwise and widthwise relation to the form and pad, and means for controlling the adjusted position of the blanket for the size of sole to be operated upon comprising parts movable with said pad support, and a member adjustable by the operator and arranged to cooperate with said last-named parts only when the pressing pad is in inoperative position.

16. In a machine for shaping soles, the combination with a form, a pressing pad, and a support for moving said pad from an inoperative position toward said form to apply shaping pressure to a sole and then reversely to release the sole from pressure, of a resilient blanket extending between the form and said pad for supporting a sole for the pressing operation, said blanket having shoulders thereon for engaging the edge face of the sole at the toe end and at one side respectively to locate the sole lengthwise and laterally of the form and pad, said blanket being movable relatively to the form and pad into different positions to locate soles of different sizes, means for thus moving the blanket, and a controlling member for operating said last-named means to determine the adjusted position of the blanket for a given size of sole only when the pressing pad is in inoperative position.

17. In a machine for shaping soles, having two sets of shaping devices operated alternately to apply shaping pressure to different soles in different locations in the machine, each set comprising a form and a pressing member movable from an inoperative position toward the form to apply the shaping pressure and then reversely to release the sole from pressure, a resilient sole-supporting blanket associated with each set of shaping devices, each blanket having shoulders thereon for engaging the edge face of a sole on the blanket at an end and at one side of the sole to locate the sole lengthwise and laterally of its associated form and pressing member, each blanket being movable relatively to its associated form and pressing member into different positions to locate soles of different sizes, means for thus moving each blanket, and a controlling member adjustable by the operator for operating either one of said last-named means to determine the adjusted position of each blanket, said means each being moved into operative relation to the controlling member in response to the movement of its associated pressing member into inoperative position.

18. In a machine for shaping soles, having two sets of shaping devices operated alternately to apply shaping pressure to different soles in different locations in the machine, each set comprising a form and a pressing member movable from an inoperative position toward the form to apply the shaping pressure and then reversely to release the sole from pressure, a resilient sole-supporting blanket associated with each set of shaping devices, each blanket having shoulders thereon for engaging the edge face of a sole on the blanket at one end and at a side to locate the sole lengthwise and laterally of its associated form and pressing member, said blankets each being adjustable relatively to its associated shaping devices to accommodate soles of different sizes, and means for adjusting that blanket the associated pressing member of which is in its inoperative position for a given size of sole and for automatically adjusting the other blanket for the same size in response to the movement of its associated pressing member into inoperative position.

19. In a machine for shaping soles, a form for shaping the shank portion of a sole, a support for said form, a pressing member movable toward said form for applying shaping pressure to a sole, a resilient blanket located between said form and pressing member and arranged to receive and position a sole in predetermined lengthwise and widthwise relation to said form and pressing member, and a pair of clamping members slidably mounted on said support and arranged to cooperate with said pressing member to clamp the toe and heel end portions of the sole on said blanket to prevent lengthwise and lateral displacement of the sole relatively to the form in the shaping operation.

20. In a machine for shaping soles, a form for shaping the shank portion of a sole, a second form for shaping an end portion of a sole, a pressing member movable toward said forms and arranged to cooperate therewith to apply shaping pressure to a sole, said second form being displaceable heightwise of the sole relatively to said first form in response to the movement of the pressing member and being arranged to cooperate with the pressing member to clamp the end portion of the sole prior to the application of the shaping pressure, and a stop for limiting the movement of the second form relatively to the first form when the second form has been moved in such relation to the first form that its sole-engaging surface forms a continuation of the sole-engaging surface of the first form.

21. In a machine for shaping soles, a form for shaping the shank and the adjacent portion of the forepart of a sole, a second form for shaping the heel end portion of the sole, a pressing member arranged to cooperate with both said forms to apply shaping pressure to the forepart, shank and heel end portions of the sole, a member for engaging the toe end portion of the sole, and means for moving said pressing member toward said forms to apply the shaping pressure, said second form and toe-engaging member being located initially closer to the pressing member than the first form and in positions to apply clamping pressure to the heel and toe end portions of the sole and being movable with the pressing member toward the first form into operative relation thereto for the sole-shaping operation.

FRED V. HART.